(12) United States Patent
Attwell et al.

(10) Patent No.: US 12,703,102 B2
(45) Date of Patent: Aug. 11, 2026

(54) METHOD OF CHECKING THE ACCURACY OF A DRILLING ROBOT

(71) Applicant: AIRBUS OPERATIONS LIMITED, Bristol (GB)

(72) Inventors: Jack Attwell, Bristol (GB); Anthony Jackson, Bristol (GB); Ian Moore, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 71 days.

(21) Appl. No.: 18/645,835

(22) Filed: Apr. 25, 2024

(65) Prior Publication Data

US 2024/0359332 A1 Oct. 31, 2024

(30) Foreign Application Priority Data

Apr. 28, 2023 (GB) .................................... 2306323

(51) Int. Cl.
*B25J 9/16* (2006.01)
*B25J 11/00* (2006.01)

(52) U.S. Cl.
CPC ........... *B25J 9/1692* (2013.01); *B25J 9/1674* (2013.01); *B25J 11/005* (2013.01)

(58) Field of Classification Search
CPC ...... B25J 9/1692; B25J 9/1674; B25J 11/005; B64F 5/10; G05B 2219/45059; G05B 2219/39024
See application file for complete search history.

(56) References Cited

U.S. PATENT DOCUMENTS 4,131,837 A * 12/1978 Whetham .......... G05B 19/4163 408/11
4,366,424 A * 12/1982 McKechnie ....... G05B 19/4207 318/568.1
4,486,128 A * 12/1984 Baker .................... B23Q 41/00 408/97
4,712,953 A * 12/1987 Witzel ................... B23Q 15/22 408/1 R (Continued)

FOREIGN PATENT DOCUMENTS

GB 2616844 A 9/2023
JP 2015000580 A 1/2015
KR 10-1042085 B1 6/2011

OTHER PUBLICATIONS

Combined Search and Examination Report for GB2306323.3, dated Nov. 2, 2023, 5 pages.

*Primary Examiner* — Bhavesh V Amin
(74) *Attorney, Agent, or Firm* — Nixon & Vanderhye, PC

(57) ABSTRACT

A method of checking the accuracy of a robot is disclosed providing a component; fitting a tool jig to the component; using the tool jig to guide a stamp tool against the component to create a first mark on the component representative of a calibrated drilling location; removing the tool jig; providing a robot, the robot including an end effector holding a marking tool; operating the robot according to a program to manoeuvre the marking tool against the component to create a second mark representative of a robot drilling location; and comparing the position of the first mark to the position of the second mark to measure a distance between the first mark and the second mark.

16 Claims, 5 Drawing Sheets

(56) References Cited

U.S. PATENT DOCUMENTS 4,892,407 A * 1/1990 McMurtry ........... G01B 11/303 33/503
4,976,019 A * 12/1990 Kitamura ............... G05B 19/18 356/501
5,055,752 A * 10/1991 Leistensnider .... G05B 19/4207 702/155
5,246,316 A * 9/1993 Smith ................ B23Q 17/2258 33/638
5,404,021 A * 4/1995 Mangano ............. G01B 11/105 250/559.39
5,446,545 A * 8/1995 Taylor .................... G01B 5/008 33/502
5,691,909 A * 11/1997 Frey ................... G05B 19/4069 702/179
5,910,894 A * 6/1999 Pryor ............... G05B 19/41875 700/95
5,949,685 A * 9/1999 Greenwood ......... G05B 19/404 700/71
6,356,807 B1 * 3/2002 McGee .................. B25J 9/1692 318/568.22
6,456,896 B1 * 9/2002 Ito ........................ G05B 19/404 700/192
6,501,262 B1 * 12/2002 Schneeberger ...... G01D 5/2448 33/DIG. 1
6,514,018 B2 * 2/2003 Martinez ................ B23Q 17/24 901/41
6,580,964 B2 * 6/2003 Sutherland ........... G01B 21/042 700/193
6,681,145 B1 * 1/2004 Greenwood ........... B25J 9/1692 700/193
6,778,928 B2 * 8/2004 Stiller ................... G01S 13/931 702/104
6,782,596 B2 * 8/2004 Miller .................... B23Q 17/20 700/145
6,810,360 B2 * 10/2004 Fujishima ............ G05B 19/404 702/182
6,922,599 B2 * 7/2005 Richey ............... G05B 19/4097 700/98
7,384,220 B2 * 6/2008 Clark ..................... B23Q 17/24 408/97
7,490,020 B2 * 2/2009 Chang ...................... G01D 3/08 33/502
7,805,212 B2 * 9/2010 Ormachea ............ B25J 19/0012 901/4
8,311,863 B1 * 11/2012 Kemp ................ G06Q 10/0639 705/7.29
8,313,271 B2 * 11/2012 Smith ................ B23Q 17/2233 409/80
9,453,913 B2 * 9/2016 Cramer ................... G01S 17/42
9,539,650 B2 * 1/2017 Frick ..................... B23B 47/287
9,753,448 B2 * 9/2017 Valsecchi ........... B23Q 11/0007
9,815,204 B2 * 11/2017 Hull ....................... B25J 9/1692
9,902,065 B2 * 2/2018 Dzierzega .............. B25J 9/1664
9,921,571 B2 * 3/2018 Crowley ............ B23Q 17/2233
10,551,821 B2 2/2020 Yamaguchi et al.
10,569,419 B2 2/2020 Yamaguchi et al.
10,704,887 B1 * 7/2020 Beardsworth ........... G01S 17/87
11,254,008 B2 2/2022 Dan
11,553,969 B1 * 1/2023 Lang .................. G02B 27/0172
11,609,544 B2 * 3/2023 Hebenstreit .......... B25H 1/0092
11,925,426 B2 * 3/2024 Frasier ................... A61B 17/17
2008/0170917 A1 * 7/2008 Hilker .................. B23C 5/1054 407/54
2009/0022556 A1 * 1/2009 Clark ..................... B23Q 17/24 408/13
2014/0342176 A1 * 11/2014 Appleby ................... B22C 9/22 428/596
2015/0013135 A1 * 1/2015 Mecner .................. B62D 65/16 29/407.01
2015/0016907 A1 * 1/2015 Frick ........................ B25H 7/02 33/485
2016/0293791 A1 * 10/2016 Spotti ..................... H02S 40/34
2016/0361768 A1 * 12/2016 Ponton .................... B23B 49/02
2018/0126507 A1 * 5/2018 Rivers .................. B23Q 11/006
2019/0196438 A1 * 6/2019 Rivers ....................... B27C 5/00
2021/0034032 A1 * 2/2021 Hebenstreit ........ B23Q 17/2233
2021/0245371 A1 8/2021 Crivella
2022/0331975 A1 10/2022 Cochrane et al.
2023/0020249 A1 * 1/2023 Frasier ................... A61B 34/30
2024/0359332 A1 * 10/2024 Attwell .................. B25J 9/1674

* cited by examiner

METHOD OF CHECKING THE ACCURACY OF A DRILLING ROBOT

CROSS RELATED APPLICATION

This application claims priority to United Kingdom Patent Application GB 2306323.3, filed Apr. 28, 2023, the entire contents of which is hereby incorporated by reference.

FIELD OF THE INVENTION

The present invention relates to a method of checking the accuracy of a drilling robot and a system for checking the accuracy of a robot.

BACKGROUND OF THE INVENTION

There is an increasing trend towards automated manufacturing processes, for instance the automated drilling of components using robots to manufacture the components more efficiently. Prior to drilling the components, it is important to ensure that the robot is operated on a program that positions the drilling tool at an accurate location. Once the accuracy of the program has been confirmed, the robot can be used on multiple components without rechecking its accuracy.

Existing methods of checking the accuracy of drilling robots include creating a mark on the component representative of a drilling location. An operator then measures the position of the mark to establish whether it is within the tolerance of the required drilling location. This can be an inefficient process that requires manually measuring the accuracy of the mark relative to datums on the component.

SUMMARY OF THE INVENTION

A first aspect of the invention provides a method of checking the accuracy of a robot, the method comprising: providing a component; fitting a tool jig to the component; using the tool jig to guide a stamp tool against the component to create a first mark on the component representative of a calibrated drilling location; removing the tool jig; providing a robot, the robot including an end effector holding a marking tool; operating the robot according to a program to manoeuvre the marking tool against the component to create a second mark representative of a robot drilling location; and comparing the position of the first mark to the position of the second mark to measure a distance between the first mark and the second mark. In this way the first mark representing a calibrated drilling location can be used as a reference against which the second mark representing the actual drilling location can be assessed.

The method may further comprise using the tool jig or tool jigs to guide the stamp tool against the component to create a plurality of first marks on the component each representative of a respective calibrated drilling location; operating the robot according to the program to manoeuvre the marking tool against the component to create a corresponding second mark representative of a robot drilling location for each first mark; and comparing the position of each first mark to the position of each corresponding second mark. The increased efficiency of the claimed method is particularly advantageous when the accuracy of the robot at multiple drilling locations needs to be assessed.

The method may further comprise comparing the position of each first mark to the position of each corresponding second mark in a sequence; and, upon detection that a distance between a first mark and corresponding second mark does not exceed a threshold value, stopping operation of the robot and altering the program. Comparing the accuracy of the second mark whilst the robot is creating further second marks allows the robot to be stopped sooner in the event that the second marks are inaccurate.

The method may be incorporated in a method of drilling a component, the method of drilling a component comprising confirming the distance between each first mark and corresponding second mark is below the threshold value; replacing the marking tool with a drilling tool; and operating the robot to drill a hole at each robot drilling location. Replacing the marking tool with a drilling tool after the accuracy of all the drilling locations has been checked improves efficiency as it reduces interruptions caused by checking and drilling each hole in turn.

The method of drilling a component may further comprise providing a second component substantially the same as the first component; and operating the robot to drill a hole at each robot drilling location based on the step of confirming the distance between each first mark and corresponding second mark is below the threshold value on the first component. Identical components can therefore be drilled without needing to check the accuracy of the holes on each component.

The robot may comprise a vision system having one or more imaging devices. The method of comparing the position of the first mark to the position of the second mark may then comprise: capturing an image of the component that shows the first mark and the second mark on the component; and using the image to compare the position of the first mark to the position of the second mark. Automating the process of checking the second mark relative to the first mark removes the need for an operator to have access to the component.

The first mark may include an at least partially non-circular portion. This allows the error between the first and second marks to be determined as a distance rather than a non-dimensional quantity and may also allow the direction of the error to be determined.

The at least partially non-circular portion may be substantially crosshair shaped. Crosshairs are a suitable means of easily determining distance and/or angle. For instance, the length of the hairs may be known, as well as the angle between the respective hairs.

The first mark may include a boundary line representative of an allowable tolerance of the position of the second mark relative to the calibrated drilling location. In this way the accuracy of the second mark may be quickly and/or easily assessed against a predefined tolerance to determine the accuracy of the robot.

The component may be an aircraft component. Aircraft components require accurate holes to be formed, and automation is an increasingly used tool to speed up production. However, the size of aircraft components (such as spars, stiffeners, fuselage frames, outer aerodynamic panels, and ribs-including rib feet and posts) often provide significant complications in terms of access to the drilling locations to determine the accuracy of the robot. Reducing the need to enter the operational area, as well as reducing any disruption when this is required, is particularly advantageous.

A further aspect of the invention provides a system for checking the accuracy of a robot, comprising: a component; a first mark on the component; a tool jig for fitting to the component; a stamp tool arranged to interact with the tool jig, the stamp tool comprising a raised profile for creating the first mark on the component, the first mark representative of a calibrated drilling location; and a robot including an end effector holding a marking tool, the marking tool configured to create a second mark representative of a robot drilling location on the component upon removal of the jig.

The stamp tool may comprise a body and a head. The body may be formed of metal and/or the head may be formed of elastomer. A metal body may allow the stamp tool to be positioned accurately relative to the tool jig, whilst the elastomer head may deform and help to create the first mark on the component.

The stamp tool head may be detachable from the stamp tool body. Different heads may therefore be fitted to create different first marks, for example having different boundary lines indicating allowable tolerances.

The stamp tool raised profile may include an at least partially non-circular portion. A non-circular portion may be used as a reference length to determine the error between the first and second marks as a unit of length rather than a non-dimensional quantity.

The at least partially non-circular portion may be substantially crosshair shaped. Crosshairs are a suitable means of easily determining distance and/or angle. For instance, the length of the hairs may be known, as well as the angle between the respective hairs.

The robot may comprise a vision system. The vision system may have one or more imaging devices for capturing an image of the component that shows the first mark and the second mark on the component. Automating the process of checking the second mark relative to the first mark removes the need for an operator to have access to the component.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
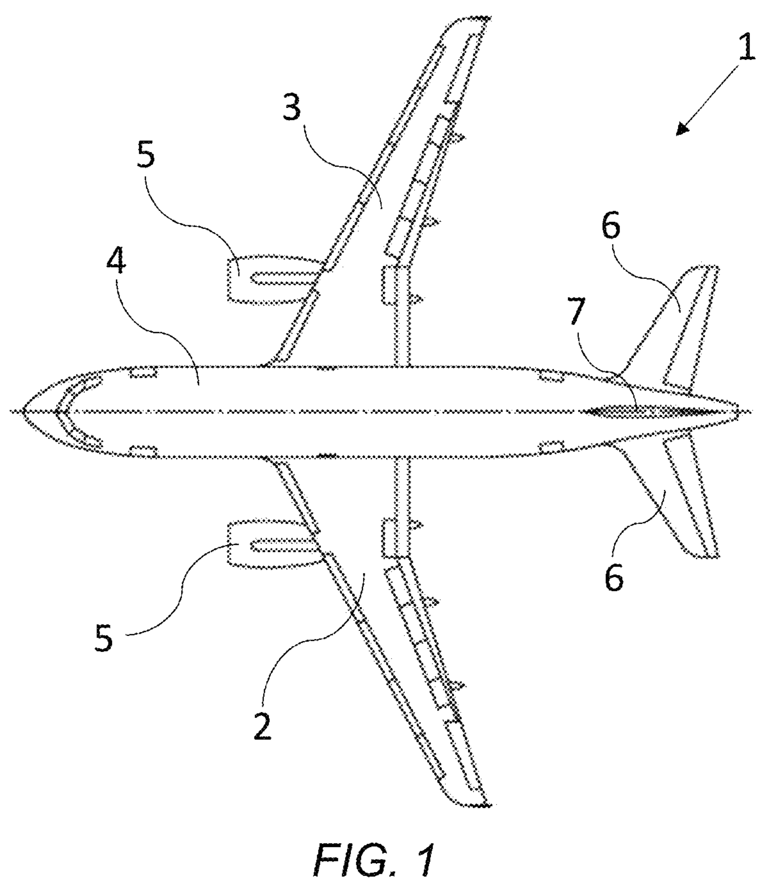
FIG. 1 shows a schematic representation of an aircraft.

FIG. 1 illustrates a typical configuration for a fixed wing passenger transport aircraft 1. The aircraft 1 comprises port and starboard wings 2, 3 extending from a fuselage 4, engines 5, a horizontal tailplane 6 and a vertical tailplane 7. It will be appreciated that this invention is applicable to a wide variety of aircraft types not just that illustrated in FIG. 1.

The assembly of aircraft components increasingly involves automated processes, for instance using robots 40, that can assist in speeding up production rates and the accuracy of operations performed on the components. To ensure efficient and accurate operations, it is first necessary to ensure the robot 40 runs on a program that is benchmarked against required tolerances.

In the event that the robot 40 is configured to drill holes in a component, the robot 40 may be operated to mark out the position of the holes prior to drilling. The operator then measures these positions manually to confirm whether they are within tolerance and thereby confirm the robots accuracy. This often requires the robot 40 to be shut-down temporarily, or even for the robot be removed to allow access to the component, thereby disrupting the manufacturing process.

The large scale of aircraft components, such as spars, stiffeners, fuselage frames, outer aerodynamic panels, and ribs often provide further complications in terms of access to the drilling locations to determine the accuracy of the robot 40. For instance, a wing box may be over 30 metres in length and require significant ground clearance to allow equipment to operate from below.

An improved method of checking the accuracy of a robot 40 is described herein, utilising a first mark 32 created using a stamp tool 30 that interacts with a tool jig 20, and a second mark 42 created by the robot 40.

Figure 2:
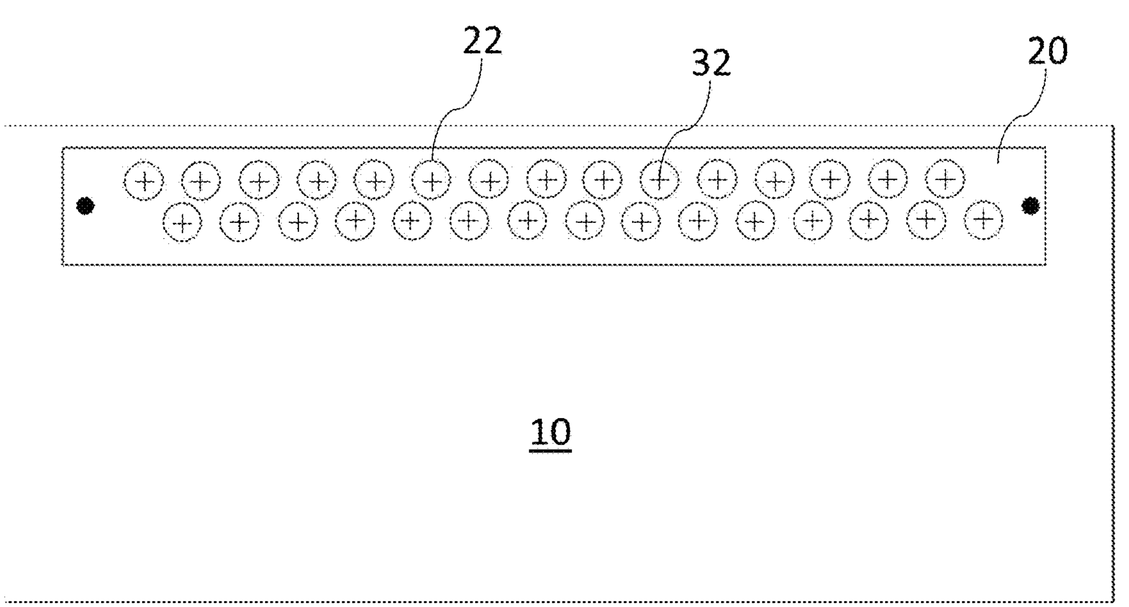
FIG. 2 shows a component with a tool jig attached thereto.

Firstly, a component 10 is provided and a tool jig 20 is fitted to the component 10 by an operator, such as shown in FIG. 2. The component 10 may be an aircraft component, such as a spar, stiffener, fuselage frame, outer aerodynamic panel or rib, although it will be appreciated that the disclosed method is suitable for operation on a broad range of components 10.

Figure 3:
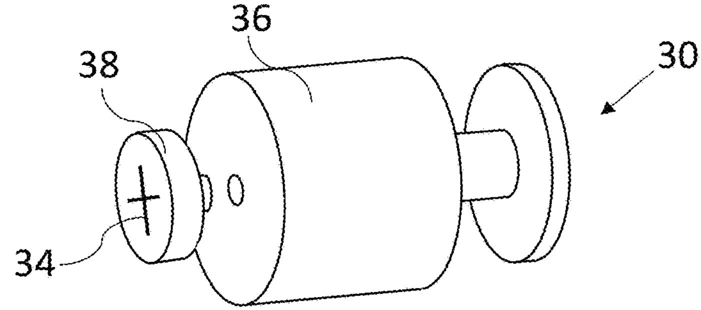
FIG. 3 shows a stamp tool.

The tool jig 20 includes one or more guiding features 22 for guiding a stamp tool 30 onto the component 10. An example of a stamp tool 30 is shown in FIG. 3. It will be appreciated that a tool jig 20 may include multiple guiding features 22 for guiding a stamp tool 30 and/or multiple tool jigs 20 may be fitted to the component 10 simultaneously that each include one or more guiding features 22. The tool jig(s) 20 is arranged to ensure that the guiding features 22 are able to accurately guide the stamp tool 30 onto the correct location on the component 10. The guiding feature(s) 22 may comprise a hole in the tool jig 20, an abutment surface for positioning against the component 10, visual alignment aids such as channels and arrows, or any combination of features thereof.

The stamp tool 30 is then used by an operator to create a first mark 32 on the component representative of a correctly calibrated drilling location. The stamp tool 30 is arranged to interact with the tool jig 20, and in particular the guiding features 22 of the tool jig 20. The stamp tool 30 comprises a body 36 and a head 38. The head 38 includes a raised profile 34 arranged to create the first mark 32 on the component 10. The head 38 of the stamp tool 30 may be detachably coupled to the body 36. In this way, different heads 38 having different raised profiles 34 may be fitted to a common body 36 to create different first marks 32. The body 36 may be formed of metal or other rigid material to ensure accurate positioning of the stamp tool 30 relative to the guiding features 22 to accurately position the first mark 32. The body 36 may be manufactured from a single piece of material. The head 36 may be formed of an elastomer. A head **36*b* formed of an elastomer will deform and thereby help to create the first mark 32 on the component 10**.

The first mark 32 may be an ink mark. The stamp tool 30 is designed to interact with the guiding features 22 of the tool jig 20 to position the first mark 32 accurately. In other words, the first mark 32 will accurately indicate a calibrated location to be drilled.

Figure 4:
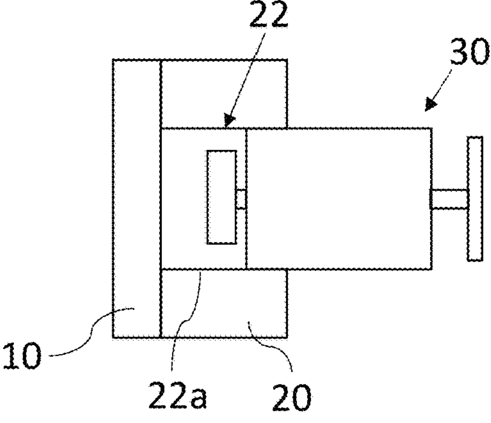
FIG. 4 shows the stamp tool inserted through a tool jig to create a first mark on a component.

As shown in FIG. 4, the stamp tool 30 may be inserted through a guiding feature 22 in the form of a hole 22*a* formed in the tool jig 20, with the stamp tool 30 contacting the walls of the hole 22*a* to ensure the stamp tool 30 is accurately guided through the hole 22*a*.

Figure 5:
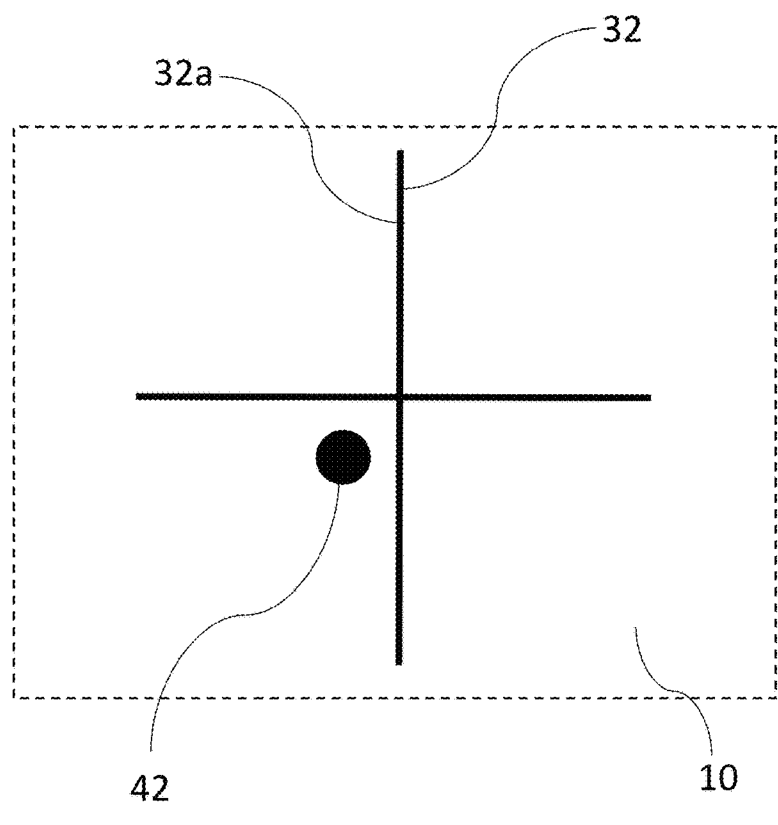
FIG. 5 shows an example of a first and second mark created on a component.

The first mark 32 may take any suitable shape, for instance the first mark 32 may comprise a dot or other circular feature to indicate a centre of the calibrated drilling location. Alternatively, or in addition, the first mark 32 may comprise a non-circular portion 32*a*. The non-circular portion 32*a* may be substantially crosshair shaped, such as shown in FIG. 5 in which the crosshair shape comprises two perpendicular straight lines that intersect. Alternatively, the crosshair shape may comprise two lines that intersect at an acute angle (i.e. not perpendicular) to form an 'X' shape. A crosshair may comprise more than two straight lines arranged to intersect at a common point. The point of intersection of the lines of a crosshair may define the calibrated drilling location. A non-circular portion 32*a* of the first mark 32 may allow the magnitude and/or direction of any error between the first 32 and second 42 marks to be determined.

Figure 6:
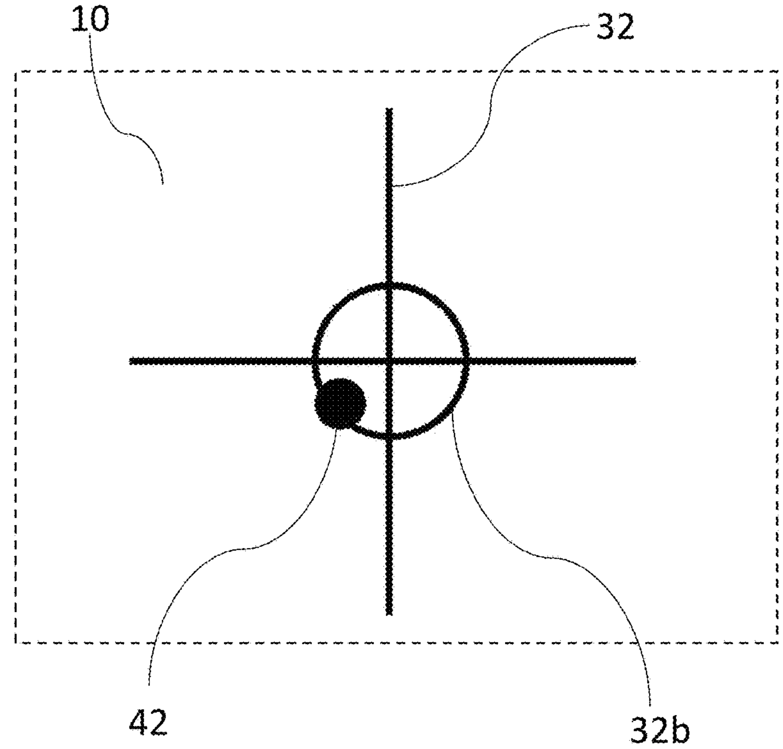
FIG. 6 shows a further example of a first and second mark created on a component.

The first mark 32 may comprise a boundary line 32*b* representative of an allowable tolerance of the position of the second mark 42 relative to the calibrated drilling location, such as shown in FIG. 6. The boundary line 32*b* may take any shape such as a circle, quadrilateral or oval. A circular boundary line 32*b* reflects a positional tolerance having equal tolerance bounds in all directions, whereas a non-circular boundary line can be specified to provide closer positional tolerances in certain directions. A second mark 42 positioned within the boundary line 32*b* may be arranged to indicate that the second mark 42 is accurately positioned, whilst a second mark 42 positioned outside the boundary line 32*b* may indicate the second mark 42 is positioned inaccurately. It will be appreciated that a tolerancing criteria will be determined in the event the second mark 42 is positioned partially over the boundary line 32*b*.

Figure 7:
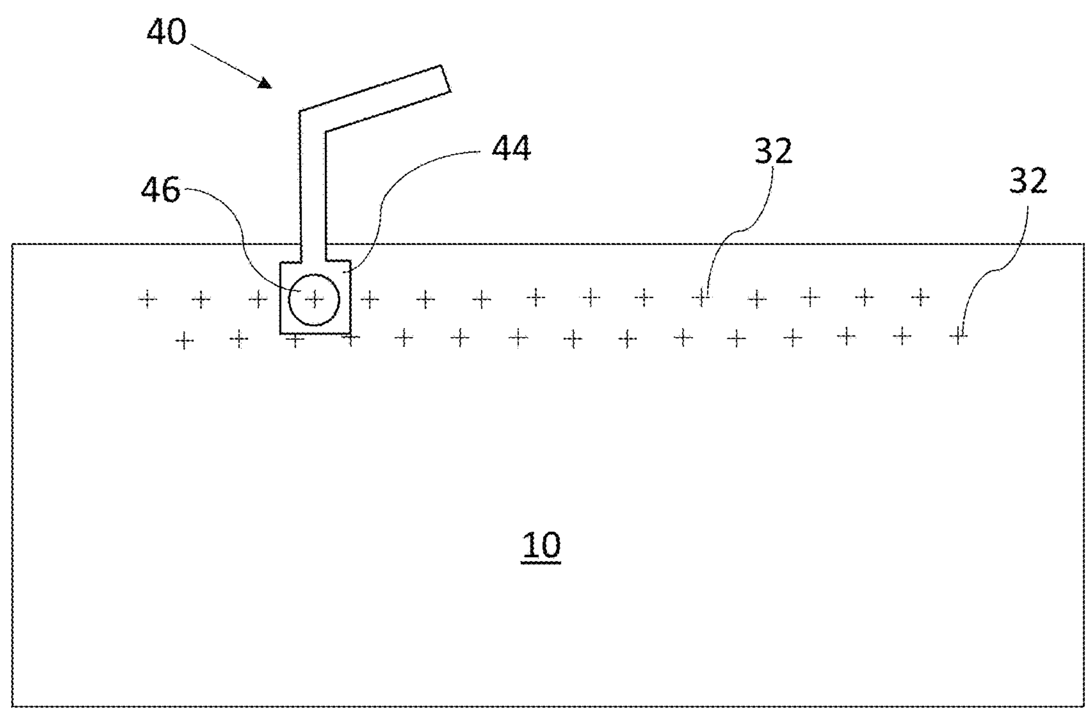
FIG. 7 shows a robot programmed to mark a component.

A series of first marks 32 may be created on the component 10, such as shown in FIG. 7, and the tool jig 20 fastened to the component 10 subsequently removed.

The robot 40 is then operated according to a programme to manoeuvre the end effector 44, and thereby the marking tool 46 held by the end effector 44, against the component 10 to create the second mark 42. The second mark 42 is representative of a robot drilling location—i.e. the location that would be drilled if the marking tool 46 were replaced with a drilling tool 50. The second mark 42 may be made using ink or any other suitable means. The programme may be set to create multiple second marks 42 on the component 10, each second mark 42 having a first mark 32 to which it is associated. The position of the second mark 42 is then compared against the position of the first mark 32. For instance, the distance between the first and second marks 32, 42 is measured. In the event that a plurality of first 32 and second 42 marks have been created, each second mark 42 is measured against its corresponding first mark 32.

The comparison of each set of marks may be conducted in sequence as each second mark 42 is created, such that any inaccuracy of the robot 40 can be identified before subsequent second marks 42 are created. In the event that it be detected that the distance between a first mark 32 and a corresponding second mark 42 exceeds a predetermined threshold value, operation of the robot 40 may be stopped and the programme altered. The programme may be altered to recalibrate the robot 40 to position the second mark 42 more accurately relative to the target drill location. Data from the measurement of the first mark 32 position relative to the position of the second mark 42 may be recorded and used in any programme alterations.

It will be appreciated that the same set of first marks 32 may be re-used to compare with any further sets of second marks 42—i.e. there is no requirement to re-create the first marks using the tool jig 20.

The robot 40 may further comprise a vision system having one or more imaging devices 48. The imaging devices 48 are arranged to capture an image of the component 10 that shows the first mark 32 and the second mark 42 on the component 10. The imaging devices 48 may be arranged to capture multiple images of each set of first and second marks 32, 42. The images may be analysed by an operator or an automated system to establish whether the second marks 42 are within an allowable tolerance relative to the first marks 32. It may be beneficial to utilise an automated imaging and analysing system such that the accuracy of the robot 40 can be determined without having to move the robot 40 to allow an operator to access the component.

It will be appreciated that the above-described method provides several benefits over alternative methods. Firstly, the creation of a first mark 32 at a calibrated drilling location provides an easily identifiable reference to which the second mark 42 can be quickly compared, thereby simplifying the process, and reducing any periods the robot 40 is out of operation. Secondly, in the event the robot 40 is incorrectly calibrated and the distance between the first and second marks 32, 42 is above a threshold value, the robot 40 can be stopped, and its programme altered, before it has finished creating all the second marks 42 on the component 10. Thirdly, the first marks 32 may each be reused for any subsequent checking of the accuracy of the robot 40.

Figure 8:
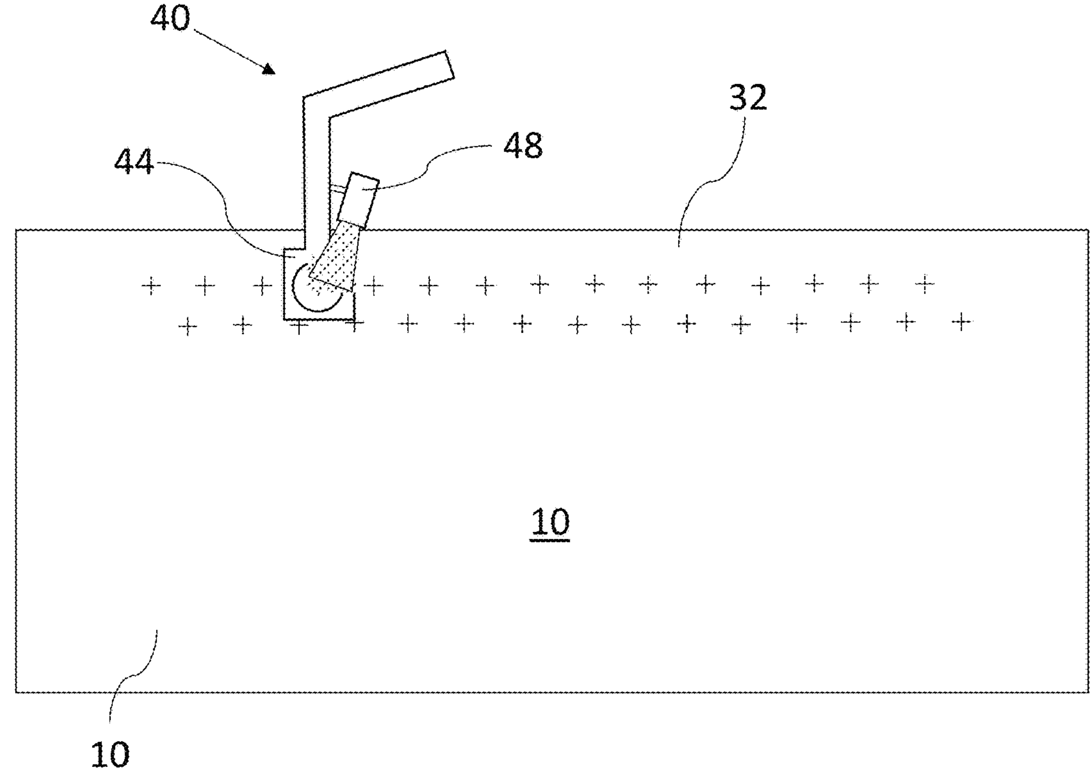
FIG. 8 shows a robot comprising a vision system programmed to mark a component.
Figure 9:
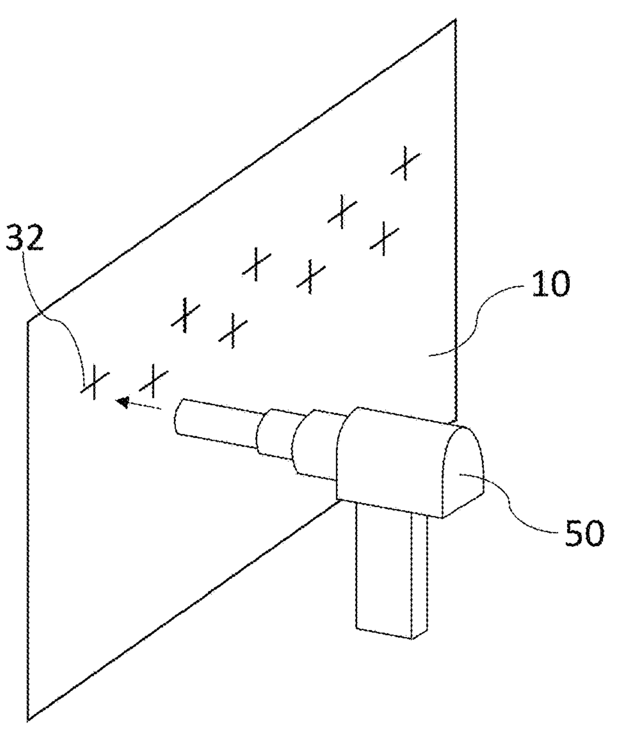
FIG. 9 shows a drilling tool for drilling a hole in a component.
Figure 10:
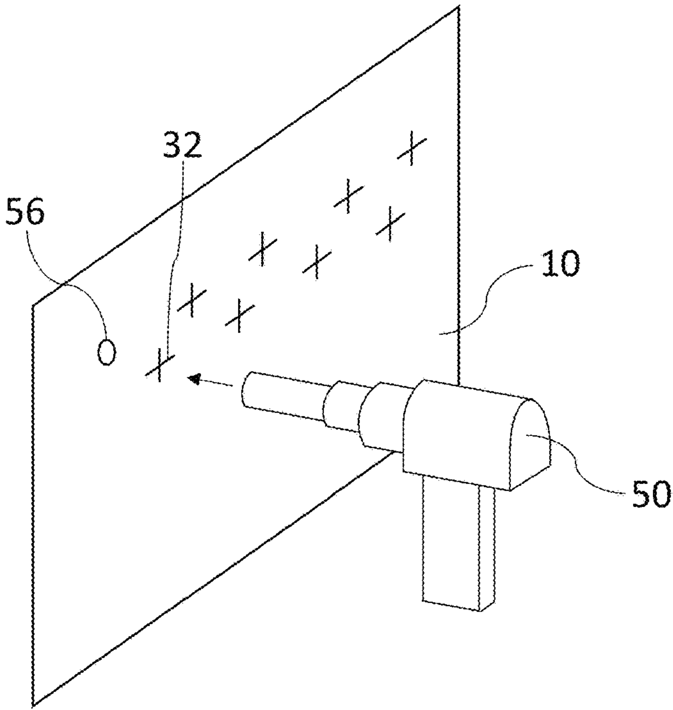
FIG. 10 shows the drilling tool of drilling a further hole in a component.

Once the robot 40 has created a set of second marks 42 that are positioned within the tolerance of the component 10, such as shown in FIGS. 7 and 8, the robot marking tool 46 may be replaced with a drilling tool 50 and the robot 40 may be operated to drill a hole 56 at each drilling location in sequence, such as shown in FIGS. 9 and 10.

Once it has been confirmed that a robot 40 is accurately calibrated for a given component 10, further identical components may be drilled without the need for checking the accuracy of the robot 40. In this way, the efficiency of the manufacturing process can be greatly improved as subsequent components can be drilled directly, without the need for tool jigs 20 to be attached and removed, and without needing to form first or second marks 32, 42.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A method of checking the accuracy of a robot, the method comprising:

providing a component;

fitting a tool jig to the component;

using the tool jig to guide a stamp tool against the component to create a first mark on the component representative of a calibrated drilling location;

removing the tool jig;

providing a robot, the robot including an end effector holding a marking tool;

operating the robot according to a program to manoeuvre the marking tool against the component to create a second mark representative of a robot drilling location; and comparing the position of the first mark to the position of the second mark to measure a distance between the first mark and the second mark.

2. The method of claim 1, further comprising:

using the tool jig or tool jigs to guide the stamp tool against the component to create a plurality of first marks on the component each representative of a respective calibrated drilling location;

operating the robot according to the program to manoeuvre the marking tool against the component to create a corresponding second mark representative of a robot drilling location for each first mark; and comparing the position of each first mark to the position of each corresponding second mark.

3. The method of claim 2, further comprising:

comparing the position of each first mark to the position of each corresponding second mark in a sequence; and, upon detection that a distance between a first mark and corresponding second mark does not exceed a threshold value, stopping operation of the robot and altering the program.

4. A method of drilling a component comprising the method of claim 1, the method further comprising:

confirming the distance between each first mark and corresponding second mark is below the threshold value, replacing the marking tool with a drilling tool; and operating the robot to drill a hole at each robot drilling location.

5. The method of drilling a component according to the method of claim 4, comprising:

providing a second component substantially the same as the first component; and, operating the robot to drill a hole at each robot drilling location based on the step of confirming the distance between each first mark and corresponding second mark is below the threshold value on the first component.

6. The method of claim 1, wherein the robot comprises a vision system having one or more imaging devices, the method of comparing the position of the first mark to the position of the second mark comprising:

capturing an image of the component that shows the first mark and the second mark on the component; and using the image to compare the position of the first mark to the position of the second mark.

7. The method of claim 1, wherein the first mark includes an at least partially non-circular portion.

8. The method of claim 7, wherein the at least partially non-circular portion is substantially crosshair shaped.

9. The method of claim 1, wherein the first mark includes a boundary line representative of an allowable tolerance of the position of the second mark relative to the calibrated drilling location.

10. The method of claim 1, wherein the component is an aircraft component.

11. A system for checking the accuracy of a robot, comprising:

a component;

a first mark on the component;

a tool jig for fitting to the component;

a stamp tool arranged to interact with the tool jig, the stamp tool comprising a raised profile for creating the first mark on the component, the first mark representative of a calibrated drilling location; and a robot including an end effector holding a marking tool, the marking tool configured to create a second mark representative of a robot drilling location on the component upon removal of the tool jig.

12. The system of claim 11, wherein the stamp tool comprises a body and a head, wherein the body is formed of metal and/or the head is formed of elastomer.

13. The system of claim 12, wherein the head is detachable from the body.

14. The system of claim 11, wherein the raised profile includes an at least partially non-circular portion.

15. The system of claim 11, wherein the at least partially non-circular portion is substantially crosshair shaped.

16. The system of claim 11, wherein the robot comprises a vision system, the vision system having one or more imaging devices for capturing an image of the component that shows the first mark and the second mark on the component.

* * * * *